(12) United States Patent
Spak et al.

(10) Patent No.: US 10,772,328 B2
(45) Date of Patent: Sep. 15, 2020

(54) METHOD OF IMPROVING PLANT HEALTH AND ROOTING OF PLANTS

(71) Applicant: Bayer CropScience LP, Research Triangle Park, NC (US)

(72) Inventors: David Spak, Cary, NC (US); Thomas James Queck, Jr., Raleigh, NC (US); Harold Quicke, Windsor, CO (US)

(73) Assignee: 800 North Lindbergh Blvd., St. Louis, MO (US)

( * ) Notice: Subject to any disclaimer, the term of this patent is extended or adjusted under 35 U.S.C. 154(b) by 0 days.

(21) Appl. No.: 15/871,234

(22) Filed: Jan. 15, 2018

(65) Prior Publication Data

US 2018/0206499 A1    Jul. 26, 2018

Related U.S. Application Data

(60) Provisional application No. 62/448,620, filed on Jan. 20, 2017.

(51) Int. Cl.
*A01N 43/68* (2006.01)

(52) U.S. Cl.
CPC .................................. *A01N 43/68* (2013.01)

(58) Field of Classification Search
None
See application file for complete search history.

(56) References Cited

U.S. PATENT DOCUMENTS 9,963,431 B2    5/2018 Bickers et al.
2013/0267417 A1*  10/2013 Seitz ...................... A01N 43/84
                                                      504/112

FOREIGN PATENT DOCUMENTS

CA    2903643 A1    9/2014

OTHER PUBLICATIONS

McCullough et al. (IndaziflamEnhances Buckhorn Plantain (*Plantago lanceolata*) Control from Postemergence Herbicides, Weed technology (2015), vol. 29, No. 1, pp. 147-153) (Year: 2015).*
Jhala et al. (Leaching of Indaziflam Compared with Residual Herbicides Commonly Used in Florida Citrus, Weed technology (2012) ,vol. 26, No. 3, pp. 602-607) (Year: 2012).*
Alonso et al. (Sorption-Desorption of Indaziflam in Selected Agricultural Soils, Journal of agricultural and food chemistry (2011), vol. 59, No. 24, p. 13096-13101.) (Year: 2011).*
Guerra et al. (Influence of precipitation and sugarcane straw in aminocyclopyrachlor and indaziflam control efficiency, Planta Daninha (2015), vol. 33, No. 3, pp. 535-542, 19 refs . . . ) (Year: 2015).*
Jose Luis Acebes et al. : "Cellulose Biosynthesis Inhibitors: Their uses as potential herbicides and as tools in cellulose and cell wall structural plasticity research" Cellulose Structure and Properties. (2010) p. 62-63.
International Search Report Issued in Counterpart Application No. PCT/US2018013698, dated Apr. 3, 2018.
BH&G Garden Editors, "7 Best Christmas Tree Types to Deck the Halls With This Year," Better Homes & Garden, (Last Updated Updated Jun. 26, 2020), https://www.bhg.com/gardening/trees-shrubs-vines/types-of-christmas-trees.
Max, "17 Types of Christmas Trees with Pictures (Real Trees You Can Get This Holiday)" Green Vibrant, (Last Updated Dec. 30, 2019), https://www.greenandvibrant.com/types-of-christmas-trees.
Erica Daniels, "16 Types of Christmas Trees," Pro Flowers, (Last Updated Nov. 15, 2018) https://www.proflowers.com/blog/16-types-of-christmas-trees.

* cited by examiner

*Primary Examiner* — Alton N Pryor
(74) *Attorney, Agent, or Firm* — McBee Moore & Vanik IP, LLC

(57) ABSTRACT

Methods and compositions for promoting health and development in a plant or crop. The disclosure further provides for compositions and methods of improving crop yield and/or plant quality.

16 Claims, No Drawings

METHOD OF IMPROVING PLANT HEALTH AND ROOTING OF PLANTS

CROSS REFERENCE TO RELATED APPLICATIONS

This application claims the benefit of U.S. Provisional Application No. 62/448,620, filed Jan. 20, 2017, the contents of which are incorporated herein by reference in its entirety.

FIELD

The disclosure provides methods for improving and promoting overall health and development of plants and crops.

BACKGROUND

There is an ongoing need for methods of improving plant health to improve overall growth, longevity, fruit/crop yield, ornamental quality, and other desired plant attributes.

Furthermore, there is an ongoing need for methods of improving plant health as a means of counteracting the possible negative effects of herbicides, such as weed killers.

Herbicides are necessary for controlling weeds and other undesired plant pests.

However, overuse of herbicides such as weed killers can be damaging not only to the unwanted species, but also to soil and the health, growth, and development of useful and desired plants and crops.

Herbicides can injure foliage, shoots, flowers, and fruits of desired plants. If injury is severe enough, either from one incident or repeated exposure, it may reduce yield, produce poor fruit quality, distort ornamental or nursery plants, and occasionally cause plant death.

Selective herbicides kill specific targets while leaving the desired plant or crop relatively unharmed. Non-selective herbicides, however, are not specific to particular species and instead kill all plant material with which they come into contact.

Cellulose biosynthesis inhibitors such as indaziflam are known herbicides, known to be particularly effective at controlling and killing undesired weeds and grasses, The present inventors have surprisingly found, that herbicides of the class known as cellulose biosynthesis inhibitors, such as indaziflam, when applied as described herein, actively promote plant health, growth, and development of desired plants.

SUMMARY

The present invention provides for methods of promoting plant health and development, wherein a composition comprising a cellulose biosynthesis inhibitor herbicide such as indaziflam is applied to plant roots and/or soil on top of plant roots or applied on or near seed or other plant propagules such as rhizomes or stolons.

It has been found that compositions comprising indaziflam can demonstrate unexpected properties of promoting plant health and development, improving crop yield, and improving plant quality.

The disclosure provides for a method of promoting plant health and development comprising applying to a plant or habitat thereof a composition comprising a cellulose biosynthesis inhibitor.

The disclosure further provides for a method of promoting plant health and development comprising applying to a plant or habitat thereof a composition comprising indaziflam.

Further objects, features, and advantages of the invention will become apparent from the detailed description that follows.

DETAILED DESCRIPTION

Applicants have now found that, surprisingly, compositions comprising an herbicide of the class known as cellulose biosynthesis inhibitors, preferably indaziflam, can be applied to seeds, plants, and/or plant parts, and soil which the plant is intended to grow in a manner to promote plant health and development. According to the present invention, any cellulose biosynthesis inhibitor may be used, alone or in combination with other active or inactive ingredients, such as diquate dibrome and glyphosate.

Previously, it has been observed that compositions comprising indaziflam possess outstanding growth-regulatory properties when indaziflam comes in contact with roots in crop plants. Moreover, compositions comprising indaziflam have been recognized as being suitable for generally controlling, and inhibiting undesired vegetative growth of plants from seed without simultaneously killing the desirable crop plants. Accordingly, the presently claimed method of promoting plant health and development is unexpected in light of the known herbicidal properties and uses of indaziflam-containing products.

The compound, indaziflam, used in the presently claimed method is described in, for example, U.S. Pat. No. 8,114,991, which is hereby incorporated by reference in its entirety. The compound taught by U.S. Pat. No. 8,114,991 is described therein as having herbicidal properties. See U.S. Pat. No. 8,114,991 at, for example, column 62, line 22 to column 72, line 43. This patent teaches that indaziflam is a plant growth regulator, also known as a plant growth retardant. Accordingly, indaziflam's ability to promote plant growth according to the present invention is surprising in light of its known use as a growth retardant.

Indaziflam's International Union of Pure and Applied Chemistry (IUPAC) name is N2[(1R,2S)-2,3-dihydro-2,6-dimethyl-1H-inden-1-yl]-6-[(1RS)-1-fluoroethyl]-1,3,5-triazine-2,4-diamine. Indaziflam is written chemically as $C_{16}H_{20}FN_5$.

Indaziflam is an alkylazine compound characterized as a cellulose biosynthesis inhibitor, belonging to Weed Science Society of America ("WSSA") Mode of Action group 29.

Additional cellulose biosynthesis inhibitors include herbicides belonging to benzamide (WSSA group 21), nitrile (WSSA group 20), and triazolocarboxamides (WSSA group 28) classes of chemicals. For example, cellulose biosynthesis inhibitors of the benzamide family include isoxaben. Cellulose biosynthesis inhibitors of the nitrile family include dichlobenil and chlorthiamid. Cellulose biosynthesis inhibitors of the triazolocarboxamide family include flupoxam.

Cellulose biosynthesis inhibitor herbicides affect synthesis of the cellulose needed for cell walls in susceptible plants, thereby inhibiting cell division. These herbicides are absorbed through susceptible plants' roots and shoot tissues and inhibit root and shoot growth.

Commercially available herbicides incorporating indaziflam as their active ingredient include, for example, Alion®, Esplanade® EZ, Esplanade® 200 SC, Specticle® G. Specticle® FLO, Specticle® Total, Specticle® 20 WSP, Marengo®, and DuraZone®. Any of these can be used in the present invention. In a preferred embodiment of the invention, the method uses indaziflam as the only active component. For example, the composition used in the method does not include other herbicides, fungicides, insecticides, or other agriculturally active components.

Indaziflam is known to be useful as a pre-emergence or post-emergence herbicide for annual grasses and broadleaf weeds. Indaziflam has been approved for use on residential and commercial property such as golf courses, lawns, walkways, cemeteries, evergreen nurseries, landscaping projects, and crop and vegetation management markets.

Herbicidal compositions comprising indaziflam are commonly used to control pests such as annual grasses and broadleaf weeds. Indaziflam works well against, for example, crabgrass, goosegrass, kyllinga, bluegrass, doveweed, swinecress, bittercress and henhit, including all weeds listed on the labels of the commercial products.

In contrast to these known uses, it has surprisingly been found that application of indaziflam to a plant or habitat thereof promotes overall plant health and development, for example, increased root growth and/or promotion of mycorrhizae.

The composition comprising a cellulose biosynthesis inhibitor is applied to a plant or habitat thereof in order to promote overall plant health and development. The composition can include any desired amount of the cellulose biosynthesis inhibitor, such as wherein said cellulose biosynthesis inhibitor is present at a concentration of 0.0001% to 20%, or 0.001% to 10%, or 0.01% to 1%, or 0.1% to 0.5% by weight of the composition.

In another aspect, the disclosure provides for a method described herein, wherein a composition comprising a cellulose biosynthesis inhibitor is applied to a plant or habitat thereof in order to promote overall plant health and development at a rate which provides the desired results without adversely affecting the desired plant, for example, at a rate of 0.1 to 10,000 grams of active ingredient per hectare (hereinafter, "g ai/ha"), preferably 1 to 1,000 g ai/ha, preferably 5-500 g ai/ha, or more preferably 10 to 300 g ai/ha or 25-250 g ai/ha or 50-200 g ai/ha.

In a preferred embodiment, the cellulose biosynthesis inhibitor is indaziflam.

"Plant health" refers to one or more advantageous properties including: emergence, crop yield, protein content, more developed root system (improved root growth), tillering increase, increase in plant height, increase in size of leaf blade, fewer dead basal leaves and/or fruit, stronger tillers, greener leaf color, pigment content, greater photosynthetic activity, decreased need for fertilizer, decrease in need for seeds, more productive tillers, earlier flowering, earlier grain maturity, less plant verse (lodging', increased shoot growth, enhanced plant vigor, increased plant stand and early germination, drought tolerance, and any other advantages familiar to a person skilled in the art.

"Promote," as used herein in connection with plant health and development, means to advance, increase, facilitate, or otherwise positively impact plant health and/or development, including but not limited to increasing shoot and/or root growth, drought tolerance, and/or fruit yield.

"Habitat" denotes where a plant or crop is growing or where a plant or crop will be grown, The method described herein can he used to treat a plant, crop, or habitat thereof.

The composition comprising a cellulose biosynthesis inhibitor can be formulated in any desired manner and include any desired excipients.

The product used can be a commercial formulation which contains various formulation additives.

The compositions can be formulated as a granular formulation, seed treatment, foliar composition, a foliar spray, solutions, emulsions, suspension, coating formulation, encapsulated formulation, solid, liquid, fertilizer, paste, powder, suspension, or suspension concentrate. The composition may be employed alone or in solid, dispersant, or liquid formulation. In yet another aspect, a composition described herein is formulated as a tank-mix product.

These formulations are produced in any desired or known manner, for example by mixing the active compounds with extenders, such as liquid solvents, pressurized liquefied gases and/or solid carriers, optionally with the use of surface-active agents, such as emulsifiers and/or dispersants and/or foam formers. If the extender used is water, it is also useful to employ for example organic solvents as cosolvents. Suitable liquid solvents include: aromatics, such as xylene, toluene or alkylnaphthalenes, chlorinated aromatics or chlorinated aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, strongly polar solvents, such as dimethylformamide and dimethyl sulphoxide, and also water. Liquefied gaseous extenders or carriers include those liquids which are gaseous at ambient temperature and at atmospheric pressure, for example aerosol propellants such as halogenated hydrocarbons and also butane, propane, nitrogen and carbon dioxide. As solid carriers there are suitable: for example, ground natural minerals, such as kaolins, clays, talc, chalk, quartz, attapulgite, montmorillonite or diatomaceous earth, and ground synthetic minerals, such as finely divided silica, alumina and silicates. As solid carriers for granules there are suitable: for example, crushed and fractionated natural rocks such as calcite, pumice, marble, sepiolite and dolomite, and also synthetic granules of inorganic and organic meals, and granules of organic material such as sawdust, coconut shells, maize cobs and tobacco stalks. As emulsifiers and/or foam formers there are suitable: for example, non-ionic and anionic emulsifiers, such as polyoxyethylene fatty acid esters, polyoxyethylene fatty alcohol ethers, for example alkylaryl polyglycol ethers, alkylsulphonates, alkyl sulphates, arylsulphonates and protein hydrolysates. As dispersants, for example, lignosulphite waste liquors and methylcellulose are suitable.

Tackifiers such as carboxymethylcellulose and natural and synthetic polymers in the form of powders, granules or latices, such as gum arabic, polyvinyl alcohol and polyvinyl acetate, as well as natural phospholipids, such as cephalins and lecithins, and synthetic phospholipids, can be used in the formulations. Other possible additives are mineral and vegetable oils.

Colorants such as inorganic pigments, for example iron oxide, titanium oxide and Prussian Blue, and organic dyestuffs, such as alizarin dyestuffs, azo dyestuffs and metal phthalocyanine dyestuffs, and trace nutrients such as salts of iron, manganese, boron, copper, cobalt, molybdenum and zinc, can also be used.

Any desired useful plant or crop can be treated by the composition of the present invention to promote the health of the plant.

Preferred are treating pines, grape crops, pome fruit crops, stone fruit crops, tree fruit and nut crops, olive crops, vine crops, woody and herbaceous ornamentals, and annual broadleaf and grass crops. in certain embodiments, the crop is other than a citrus plant. The treatment of these useful plants and crops by the claimed method increases the plant health of the plant or crop.

Preferred are treating pines, including pines of the species *P. taeda, P. densata, P. densiflora, P. fragilissima, P. henryi, P. hwangshanensis, P. kesiya, P. latteri-Tenasserim pine, P. luchuensis, P. massoniana, P. merkusii, P. mugo, P. nigra, P. resinosa, P. sylvestris, P. tabuliformis, P. taiwanensis, P. thunbergii, P. tropicalis, P. uncinata, P. yunnanensis, P. driftwoodensis, P. brutia, P. canariensis, P. halepensis, P. heldreichii, P. pinaster, P. pinea, P. roxburghii, P. attenuata, P. caribaea, P. cubensis, P. echinata, P. elliottii, P. glabra, P. greggii, P. herrerae, P. jaliscana, P. lawsonii, P. leiophylla, P. lumholtzii, \P. matthewsii, P. muricata, P. occidentalis, P. oocarpa, P. palustris, P. muricata, P. patula, P. praetermissa, P. pringlei, P. pungens, P. radiata, P. rigida, P. serotina, P. tecumumanii, P. teocote, P. banksiana, P. clausa, P. contorta, P. virginiana, P. arizonica, P. cooperi, P. coulteri, P. donnellsmithii, P. devoniana, P. douglasiana, P. durangensis, P. engelmannii, P. hartwegii, P. jeffreyi, \P. johndayensis, P. maximinoi, P. montezumae, P. nubicola, P. ponderosa, P. pseudostrobus, P. sabiniana, P. torreyana,* and *P. washoensis.*

Also preferred are treating perennial grasses, broadleaf forbs and other desirable broadleaf plants in natural areas and range and pasture areas, including but not limited to big bluestem (*Andropogon gerardii*), blue grama (*Bouteloua gracilis*), bluebunch wheatgrass (*Pseudoroegneria spicata*), buffalograss (*Bouteloua dactyloides*), Columbia needlegrass (*Achnatherum nelsonii*), eastern gammagrass (*Tripsacum dactyloides*), green needlegrass (*Nasselia viridula*), Griffith's wheatgrass (*Agropyron griffithsii*), Idaho fescue (*Festuca idahoensis*), Indian ricegrass (*Achnatherum hymenoides*), Indiangrass (*Sorghastrum nutans*), Kentucky bluegrass (*Poa pratensis*), little bluestem (*Schizachyrium scoparium*), mountain brome (*Bromus marginatus*), Muhlys (*Muhlenbergia* spp.), needle-and-thread (*Heterostipa comate*), nodding brome (*Bromus anomalus*), Parry oatgrass (*Danthonia parryi*), prairie junegrass (*Koeleria macrantha*), sand bluestem (*Andropogon hallii*), sand lovegrass (*Koeleria macrantha*), sandberg bluegrass (*Poa secunda*), sedges (*Carex* spp., both wetland and upland), slender wheatgrass (*Elymus trachycaulus*), switchgrass (*Panicum virgatum*), timber oatgrass (Danthonia intermedia), western wheatgrass (*Pascopyrum smithii*), American peavine (*Vicia Americana*), and scarlet globemallow (*Sphaeralcea coccinea*).

Plants are understood as meaning, in the present context, all plants and plant populations, such as desired wild plants or crop plants (including naturally occurring crop plants). Crop plants or crops may be plants which can be obtained by conventional breeding and optimization methods or else by biotechnological and genetic engineering methods or by combinations of these methods, including the transgenic plants and including the plant varieties capable or not capable of being protected by plant breeders' rights.

A composition described herein can be applied to a soil, plant, crop, seed, leaf, or plant part thereof in a single application step. In another aspect, a composition described herein is applied to a plant, crop, seed, leaf, or plant part thereof in multiple application steps, for example, two, three, four, five or more application steps. In another aspect, the second, third, fourth, or fifth or more application steps may be with the same or different compositions. The methods described herein also provide for an aspect where multiple application steps are excluded.

A composition described herein can be applied to a soil, plant, crop, seed, or plant part thereof in one or more application intervals of about 30 minutes, about 1 hour, about 2 hours, about 6 hours, about 8 hours, about 12 hours, about 1 day, about 5 days, about 7 days, about 10 days, about 12 days, about 14 days, about 21 days, about 28 days, about 35 days, about 45 days, about 50 days, or about 56 days.

A composition described herein can be applied to a plant, crop, seed, or plant part thereof one or more times during a growing, planting, or harvesting season. In another aspect, a compound or composition described herein is applied to a plant, crop, seed, or plant part thereof in one, two, three, four, or five or more times during a growing, planting, or harvesting season. In another aspect, a compound or composition described herein is applied to a plant, crop, seed, or plant part thereof only one time, no more than two times, or no more than three times during a growing, planting, or harvesting season. In yet another aspect, a compound or composition is applied in a single step to a seed. In yet another aspect, a seed described herein is planted in a one-pass application step.

In another aspect, the disclosure provides for pre-plant, pre-emergent, post-emergent, application steps or combinations thereof In another aspect, a compound or composition described herein is first applied in a pre-plant step and followed by one or more pre-emergent or post-emergent steps. In yet another aspect, the disclosure provides for only a pre-plant step.

Methods described herein can be used in the treatment of genetically modified organisms (GMOs), e.g., plants or seeds. Genetically modified plants (or transgenic plants) are plants of which a heterologous gene has been stably integrated into genome. The expression "heterologous gene" essentially means a gene which is provided or assembled outside the plant and when introduced in the nuclear, chloroplastic or mitochondrial genome gives the transformed plant new or improved agronomic or other properties by expressing a protein or polypeptide of interest or by down-regulating or silencing other gene(s) which are present in the plant (using for example, antisense technology, cosuppression technology or RNA interference—RNAi-technology). A heterologous gene that is located in the genome is also called a transgene. A transgene that is defined by its particular location in the plant genome is called a transformation or transgenic event.

In an aspect, plants can be obtained by traditional breeding and optimization methods or by biotechnological and recombinant methods, or combinations of these methods, including the transgenic plants and including the plant varieties which are capable or not capable of being protected by Plant Breeders' Rights.

In another aspect, plant species and plant varieties which are found in the wild or which are obtained by traditional biological breeding methods, such as hybridization or protoplast fusion, and parts of these species and varieties are treated. In a further preferred embodiment, transgenic plants and plant varieties which were obtained by recombinant methods, if appropriate in combination with traditional methods (genetically modified organisms) and their parts are treated.

"Plant parts" should be understood as meaning all above ground and subsoil parts and organs of plants, such as shoot, leaf, flower, root, leaves, needles, stalks, stems, fruiting bodies, fruits and seeds, tubers and rhizomes. Plant parts also include harvested crops, and also vegetative and generative propagation material, for example cuttings, tubers, rhizomes, slips and seeds.

Seeds, plant parts, leaves, and plants may be treated with the described compositions by applying the compounds or compositions directly to the seed, plant part, leaf, or plant. In another aspect, the seed, plant part, leaf, or plant may be treated indirectly, for example by treating the environment or habitat in which the seed, plant part, leaf, or plant is exposed to. Conventional treatment methods may he used to treat the environment or habitat including dipping, spraying, fumigating, chemigating, fogging, scattering, brushing on, shanking or injecting.

"Habitat" denotes where a plant or crop is growing or where a plant or crop will be grown. The composition can be used to treat the plant, crop, or habitat thereof.

According to the invention, the treatment of the plants and seeds with a composition described herein can be carried out directly by the customary treatment methods, for example by immersion, spraying, vaporizing, fogging, injecting, dripping, drenching, broadcasting or painting, and seed treatment.

A compound or composition described herein can take any of a variety of dosage forms including, without limitation, suspension concentrates, aerosols, capsule suspensions, cold-fogging concentrates, warm-togging concentrates, encapsulated granules, fine granules, flowable concentrates for the treatment of seed, ready-to-use solutions, dustable powders, emulsifiable concentrates, oil-in-water emulsions, water-in-oil emulsions, macrogranules, microgranules, oil-dispersible powders, oil-miscible flowable concentrates, oil-miscible liquids, foams, pastes, pesticide-coated seed, suspoemulsion concentrates, soluble concentrates, wettable powders, soluble powders, dusts and granules, water-soluble granules or tablets, water-soluble powders for the treatment of seed, wettable powders, natural products and synthetic substances impregnated with a compound or composition described herein, a net impregnated with a compound or composition described herein, and also .microencapsulations in polymeric substances and in coating materials for seed, and also UV cold-fogging and warm-fogging formulations.

A composition disclosed herein may optionally include one or more additional compounds providing an additional beneficial or otherwise useful effect. Such compounds include, without limitation, an adhesive, a surfactant, a solvent, a wetting agent, an emulsifying agent, a carrier, an adjuvant, a diluent, a dispersing agent an insecticide, a pesticide, a fungicide, a fertilizer of a micronutrient or macronutrient nature, a herbicide, a feeding inhibitor, an insect molting inhibitor, an insect mating inhibitor, an insect maturation inhibitor, a nematacide, a nutritional or horticultural supplement, or any combination thereof. In an aspect, a composition described herein is odor free.

Compositions described herein can be combined with a fertilizer. Examples of fertilizers capable of being used with the compositions and methods described herein include, for example, urea, ammonium nitrate, ammonium sulfate, calcium nitrate, diammonium phosphate, monoammonium phosphate, triple super phosphate, potassium nitrate, potassium nitrate, nitrate of potash, potassium chloride, muriate of potash, di- and mono- potassium salts of phosphite/ phosphonate.

As demonstrated in the below Examples, it has been found by the inventors that there is a rate response indicating that there is a biologically unique response that has an optimum concentration or application rates of cellulose biosynthesis inhibitors. Accordingly, it has been found that negative effects may be observed at increased concentrations or application rates. Likely because cellulose biosynthesis inhibitors are herbicides, negative impacts on plant health have been found above a certain threshold for a particular plant or crop. The optimum concentration or application rate of, for example, indaziflam, for promoting plant growth while reducing negative effects, in view of the present disclosure, would be readily determinable by a person of skill in the art.

The following examples serve to illustrate certain aspects of the disclosure and are not intended to limit the disclosure.

EXAMPLES

Example 1

*Pinus Taeda*

Loblolly pine (*P. taeda*) seeds were soaked in water for 24 hours and then placed in cold storage in a punctured bag for four weeks.

20 seeds were placed in pots on soil surface and top-dressed with one cup of sandy loam soil, about ⅛" to ¼" deep. The pots were irrigated and allowed to settle for 24 hours.

The soil was sprayed with a commercially available composition comprising indaziflam (commercial name Esplanade 200SC) using a single nozzle with a compressed $CO_2$ backpack set at 32 psi for 25 gallons per acre. Overhead irrigation was set for twice daily.

Untreated *P. taeda* shoot weighed approximately 0.19 grams and untreated root weighed approximately 0.06 grams.

*P. taeda* shoot treated at a rate of 50 g indaziflam per hectare weighed approximately 0.30 grams and root treated at a rate of 50 g indaziflam per hectare weighed approximately 0.15 grams.

*P. taeda* shoot treated at a rate of 71.4 g indaziflam per hectare weighed approximately 0.50 grams and root treated at a rate of 71.4 g indaziflam per hectare weighed approximately 0.25 grams.

*P. taeda* shoot treated at a rate of 100 g indaziflam per hectare weighed approximately 0.22 grams and root treated at a rate of 100 g indaziflam per hectare· weighed approximately 0.14 grams.

Example 2

*Pinus Echinata*

Shortleaf pine (*P. echinata*) seeds were soaked in water for 24 hours and then placed in cold storage in a punctured bag for four weeks.

20 seeds were placed in pots on soil surface and top-dressed with one cup of sandy loam soil, about ⅛" to ¼" deep. The pots were irrigated and allowed to settle for 24 hours.

The soil was sprayed with a commercially available composition comprising indaziflam (commercial name Esplanade 200SC) using a single nozzle with a compressed $CO_2$ backpack set at 32 psi for 25 gallons per acre. Overhead irrigation was set for twice daily.

Untreated *P. echinata* shoot weighed approximately 0.10 grams and untreated root weighed approximately 0.05 grams.

*P. echinata* shoot treated at a rate of 50 g indaziflam per hectare weighed. approximately 0.34 grams and root treated at a rate of 50 g indaziflam per hectare weighed approximately 0.13 grams.

*P. echinata* shoot treated at a rate of 71.4 g indaziflam per hectare weighed approximately 0.40 grams and root treated at a rate of 71.4 g indaziflam per hectare weighed approximately 0.27 grams.

*P. echinata* shoot treated at a rate of 100 g indaziflam per hectare weighed approximately 0.24 grams and root treated at a rate of 100 g indaziflam per hectare weighed approximately 0.22 grams.

Example 3

*Pinus Virginiana*

Virginia pine (*P. virginiana*) seeds were soaked in water for 24 hours and then placed in cold storage in a punctured bag for four weeks.

20 seeds were placed in pots on soil surface and top-dressed with one cup of sandy loam soil, about 1/8" to 1/4" deep. The pots were irrigated and allowed to settle for 24 hours.

The soil was sprayed with a commercially available composition comprising indaziflam (commercial name Esplanade 200SC) using a single nozzle with a compressed $CO_2$ backpack set at 32 psi for 25 gallons per acre. Overhead irrigation was set for twice daily.

Untreated *P. virginiana* shoot weighed approximately 0.11 grams and untreated root weighed approximately 0.05 grams.

*P. virginiana* shoot treated at a rate of 50 g indaziflam per hectare weighed approximately 0.23 grams and root treated at a rate of 50 g indaziflam per hectare weighed approximately 0.14 grams.

*P. virginiana* shoot treated at a rate of 71.4 g indaziflam per hectare weighed approximately 0.41 grams and root treated at a rate of 71.4 g indaziflam per hectare weighed approximately 0.27 grams.

*P. virginiana* shoot treated at a rate of 100 g indaziflam per hectare weighed approximately 0.34 grains and root treated at a rate of 100 g indaziflam per hectare weighed approximately 0.22 grams.

The invention claimed is:

1. A method for promoting root and shoot growth of a plant and plant development comprising applying a composition comprising indaziflam to soil in which a seed of said plant is planted or is to be planted,
   wherein said plant belongs to the genus *Pinus*,
   wherein the soil is treated in a pre-emergence step, and
   wherein the composition is applied at a rate of between 10 g/ha and 300 g/ha indaziflam.

2. The method according to claim 1, wherein indaziflam is present at a concentration of 0.0001% to 20% by weight of the composition.

3. The method according to claim 1, wherein indaziflam is present at a concentration of 0.001% to 10% by weight of the composition.

4. The method according to claim 1, wherein indaziflam is present at a concentration of 0.01% to 1% by weight of the composition.

5. The method according to claim 1, wherein indaziflam is present at a concentration of 0.1% to 0.5% by weight of the composition.

6. The method according to claim 1, wherein the plant belongs to the species *P. taeda*.

7. The method according to claim 1, wherein the plant belongs to the species *P. echinata*.

8. The method according to claim 1, wherein the plant belongs to the species *P. virginiana*.

9. The method according to claim 1, wherein indaziflam is the only active herbicide component of the composition.

10. The method according to claim 1, wherein the soil is treated post-emergent.

11. The method according to claim 1, wherein roots of the plant grown from the seed are of increased weight.

12. The method according to claim 1, wherein the shoot of the plant grown from the seed are of increased weight.

13. The method according to claim 1, wherein the composition is applied at a rate of between 25 g/ha and 250 g/ha indaziflam.

14. The method according to claim 1, wherein the composition is applied at a rate of between 50 g/ha and 200 g/ha indaziflam.

15. The method according to claim 1, wherein the composition is applied at a rate of between 25 g/ha and 100 g/ha indaziflam.

16. The method according to claim 1, wherein indaziflam is the only active component of the composition which promotes the root and the shoot growth of the plant and development.

\* \* \* \* \*